(12) United States Patent
Braun et al.

(10) Patent No.: US 10,415,494 B2
(45) Date of Patent: Sep. 17, 2019

(54) METHOD FOR OPERATION OF AN INTERNAL COMBUSTION ENGINE

(71) Applicant: Continental Automotive GmbH, Hannover (DE)

(72) Inventors: Tobias Braun, Undorf (DE); Josef Kainz, Salching (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/775,350

(22) PCT Filed: Sep. 28, 2016

(86) PCT No.: PCT/EP2016/073070
§ 371 (c)(1),
(2) Date: May 10, 2018

(87) PCT Pub. No.: WO2017/080711
PCT Pub. Date: May 18, 2017

(65) Prior Publication Data
US 2018/0355815 A1    Dec. 13, 2018

(30) Foreign Application Priority Data
Nov. 13, 2015    (DE) .......................... 10 2015 222 408

(51) Int. Cl.
*F02D 41/28* (2006.01)
*F02D 41/00* (2006.01)
(Continued)

(52) U.S. Cl.
CPC ......... *F02D 41/28* (2013.01); *F02D 41/0002* (2013.01); *F02D 41/009* (2013.01);
(Continued)

(58) Field of Classification Search
CPC .... F02D 41/009; F02D 41/2432; F02D 41/28; F02D 41/0002; F02D 41/3005;
(Continued)

(56) References Cited

U.S. PATENT DOCUMENTS 6,804,997 B1 * 10/2004 Schwulst ............. F02D 41/009
73/114.26
2009/0132144 A1 * 5/2009 Shinozaki ............... F02D 15/02
701/102

(Continued)

FOREIGN PATENT DOCUMENTS

DE         3506114 A1    9/1986 ............ F02D 41/14
DE    102004057260 A1    6/2006 ............ F02D 41/00

(Continued)

OTHER PUBLICATIONS

German Office Action, Application No. 102015222408.2, 10 pages, dated Jun. 14, 2016.
International Search Report and Written Opinion, Application No. PCT/EP2016/073070, 17 pages, dated Jan. 30, 2017.

*Primary Examiner* — Sizo B Vilakazi
(74) *Attorney, Agent, or Firm* — Slayden Grubert Beard PLLC

(57) ABSTRACT

Various embodiments may adjust fuel injections to account for phase differences of the piston stroke and the valve strokes of a reciprocating-piston engine. For example: measuring dynamic pressure oscillations assigned of the air in the intake tract or the gas in the outlet tract; determining a crankshaft phase angle signal; determining the phase positions of selected signal frequencies of the oscillations in relation to the signal; determining lines of equal phase positions based on the phase positions of the selected frequencies; determining a common intersection point of the lines by projection into a common plane spanned by inlet valve stroke phase difference and outlet valve stroke phase difference and signal-frequency-dependent phase shifting;

(Continued)

determining the inlet and outlet phase difference from the common intersection point; determining the piston stroke phase difference from the phase shift; and adjusting an amount of a fuel injection based on the determined differences.

11 Claims, 6 Drawing Sheets

(51) Int. Cl.
    *F02D 41/24*     (2006.01)
    *F02D 41/30*     (2006.01)

(52) U.S. Cl.
    CPC ..... *F02D 41/2432* (2013.01); *F02D 41/2464* (2013.01); *F02D 41/3005* (2013.01); *F02D 2041/001* (2013.01); *F02D 2041/288* (2013.01); *F02D 2200/0406* (2013.01); *Y02T 10/42* (2013.01)

(58) Field of Classification Search
    CPC ........... F02D 41/2464; F02D 2041/288; F02D 2200/0406; F02D 2041/001; Y02T 10/42
    See application file for complete search history.

(56) References Cited

U.S. PATENT DOCUMENTS

| | | | | |
|---|---|---|---|---|
| 2009/0312932 | A1* | 12/2009 | Wang | F02D 35/024 701/102 |
| 2010/0063775 | A1* | 3/2010 | Colling | G01M 15/00 702/182 |
| 2010/0083640 | A1* | 4/2010 | Wang | F02D 35/026 60/286 |
| 2010/0145595 | A1* | 6/2010 | Bellistri | F02D 11/10 701/103 |
| 2013/0024089 | A1* | 1/2013 | Wang | F02D 41/1462 701/102 |
| 2013/0096809 | A1* | 4/2013 | Haeming | F02D 13/0219 701/111 |
| 2016/0305356 | A1* | 10/2016 | Iwata | F02D 41/403 |

FOREIGN PATENT DOCUMENTS

| | | | | |
|---|---|---|---|---|
| DE | 102005007057 A1 | 8/2006 | ............ | F02D 41/18 |
| DE | 102012110028 A1 | 4/2013 | ............ | F02D 41/00 |
| EP | 1811161 A1 | 7/2007 | ............ | F02D 41/00 |

* cited by examiner

METHOD FOR OPERATION OF AN INTERNAL COMBUSTION ENGINE

CROSS-REFERENCE TO RELATED APPLICATIONS

This application is a U.S. National Stage Application of International Application No. PCT/EP2016/073070 filed Sep. 28, 2016, which designates the United States of America, and claims priority to DE Application No. 10 2015 222 408.2 filed Nov. 13, 2015, the contents of which are hereby incorporated by reference in their entirety.

TECHNICAL FIELD

The present disclosure relates to internal combustion engines. Various embodiments thereof may include methods for identifying phase differences of the piston stroke and of the valve stroke of the inlet valves and of the outlet valves of a reciprocating-piston internal combustion engine during operation.

BACKGROUND

Reciprocating-piston internal combustion engines, which will hereinafter also be referred to in shortened form merely as internal combustion engines, have one or more cylinders in which in each case one reciprocating piston is arranged.

SUMMARY

Some embodiments of the teachings of the present disclosure may include a method for the combined identification of a piston stroke phase difference, of an inlet valve stroke phase difference and an outlet valve stroke phase difference of a cylinder of a series-production internal combustion engine during operation. For example, dynamic pressure oscillations, assignable to the cylinder, of the intake air in the air intake tract and/or of the exhaust gas in the exhaust-gas outlet tract of the respective series-production internal combustion engine are measured during operation and a corresponding pressure oscillation signal is generated from these, and a crankshaft phase angle signal is determined at the same time. From the pressure oscillation signal, using discrete Fourier transformation, the phase positions of selected signal frequencies of the measured pressure oscillations in relation to the crankshaft phase angle signal are determined. On the basis of the determined phase positions of the respective selected signal frequencies, determining lines of equal phase positions of the selected signal frequencies, which lines are dependent on inlet valve stroke phase difference and outlet valve stroke phase difference, using reference lines of equal phase positions, which reference lines are stored in reference line characteristic maps or determined by means of a respective algebraic model function. Some embodiments may include determining a common intersection point of the determined lines of equal phase positions of the selected signal frequencies by projection into a common plane spanned by inlet valve stroke phase difference and outlet valve stroke phase difference and signal-frequency-dependent phase shifting of the determined lines of equal phase positions. Some embodiments may include determining the inlet valve stroke phase difference and the outlet valve stroke phase difference from the determined common intersection point of the lines of equal phase positions of the selected signal frequencies.

Some embodiments may include determining the piston stroke phase difference from the values of the phase shift that has been performed to the common intersection point of the lines of equal phase positions of the selected signal frequencies.

Some embodiments may include performing measurement on a reference internal combustion engine in order to determine reference lines of equal phase positions of selected signal frequencies of the pressure oscillation signal of the intake air in the air intake tract and/or of the exhaust gas in the exhaust-gas outlet tract in a manner dependent on reference inlet valve stroke phase difference and reference outlet valve stroke phase difference. Some embodiments may include storing the reference lines of equal phase positions of the selected signal frequencies of the pressure oscillation signal in a manner dependent on reference inlet valve stroke phase difference and reference outlet valve stroke phase difference in reference line characteristic maps.

In some embodiments, the reference line characteristic maps are stored in a memory area of an engine control unit of the respective series-production internal combustion engine.

In some embodiments, from the reference line characteristic maps of the selected signal frequencies of the pressure oscillation signal, for the respective signal frequency, an algebraic model function is derived which replicates the profile of the respective reference lines of equal phase positions of the selected signal frequencies of the pressure oscillation signal in a manner dependent on reference inlet valve stroke phase difference and reference outlet valve stroke phase difference.

In some embodiments, the algebraic model functions for the selected signal frequencies are stored in a memory area of an engine control unit of the respective series-production internal combustion engine.

In some embodiments, the projection of the determined lines of equal phase positions into a common plane spanned by inlet valve stroke phase difference and outlet valve stroke phase difference, and the signal-frequency-dependent phase shifting of the determined lines of equal phase positions in order to determine their common intersection point, are performed on the basis of corresponding algebraic functions.

In some embodiments, the method is executed on an electronic, programmable engine control unit of the respective series-production internal combustion engine.

In some embodiments, an adaptation of control variables or control routines in the context of a correction of or adaptation to the determined piston stroke phase difference, the determined inlet valve stroke phase difference and the determined outlet valve stroke phase difference is performed on the engine control unit.

In some embodiments, the selected signal frequencies include the intake frequency and further multiples of the intake frequency of the internal combustion engine.

In some embodiments, the dynamic pressure oscillations are measured by means of a series-production-type pressure sensor in the intake pipe.

In some embodiments, the crankshaft phase angle signal is determined by means of a toothed gear connected to the crankshaft and by means of a Hall sensor.

BRIEF DESCRIPTION OF THE DRAWINGS

A detailed consideration of the relationships used by the teachings herein is presented below, with reference to the figures.

In the figures.

DETAILED DESCRIPTION

Figure 1:
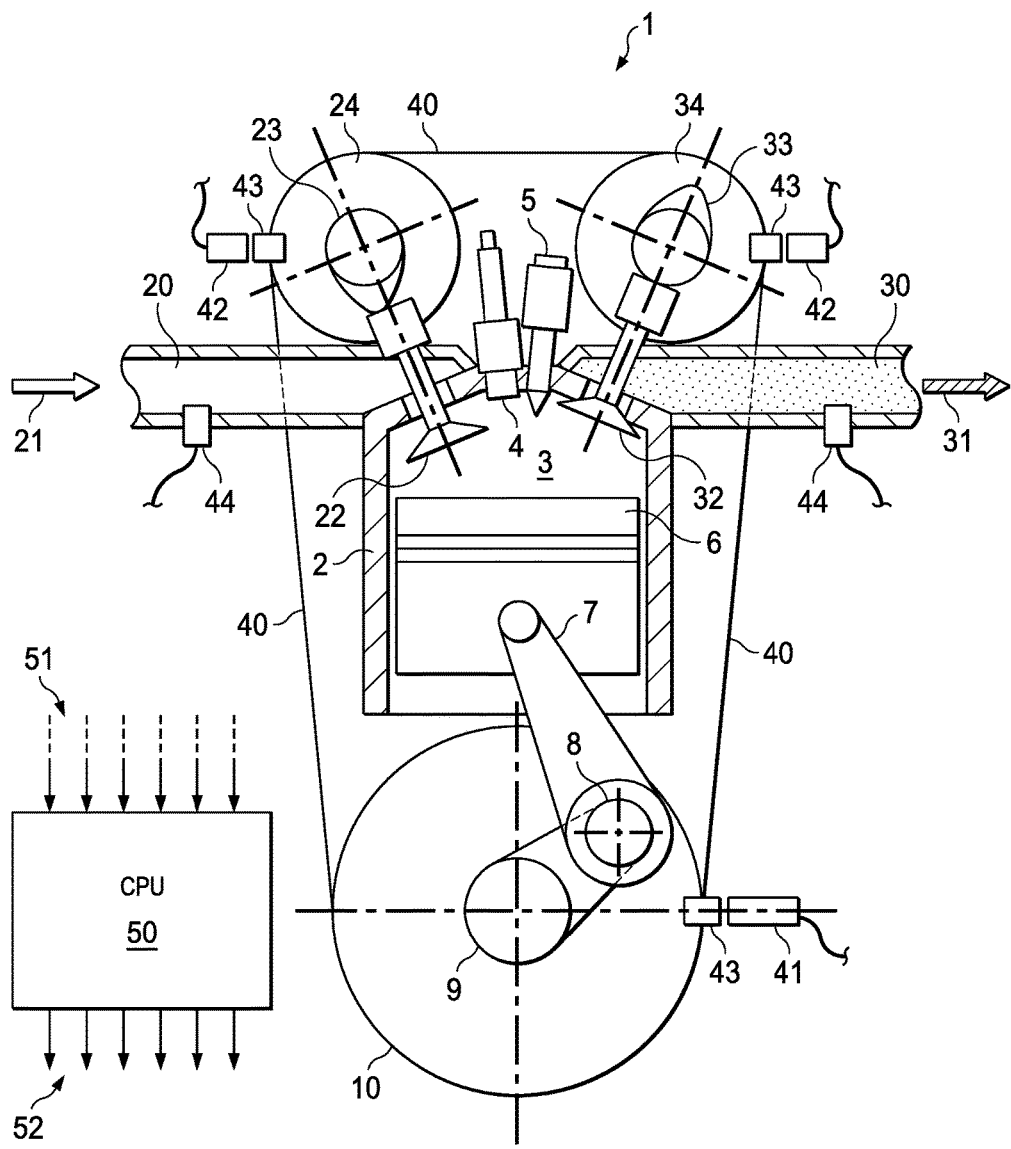
FIG. 1 shows a simplified schematic drawing of a reciprocating-piston internal combustion engine.

To illustrate the principle of a reciprocating-piston internal combustion engine, reference will be made below to FIG. 1, which illustrates a cylinder of an internal combustion engine, e.g., a multi-cylinder internal combustion engine, together with the most important functional units.

The reciprocating piston 6 is arranged in linearly movable fashion in the respective cylinder 2 and, together with the cylinder 2, encloses a combustion chamber 3. The respective reciprocating piston 6 is connected by a connecting rod 7 to a respective crankpin 8 of a crankshaft 9, wherein the crankpin 8 is arranged eccentrically with respect to the crankshaft axis of rotation 9a.

As a result of the combustion of a fuel-air mixture in the combustion chamber 3, the reciprocating piston 6 is driven linearly "downward". The translational stroke movement of the reciprocating piston 6 is transmitted by means of the connecting rod 7 and crankpin 8 to the crankshaft 9 and is converted into a rotational movement of the crankshaft 9, which causes the reciprocating piston 6, after it passes through a bottom dead center in the cylinder 2, to be moved "upward" again in the opposite direction as far as a top dead center.

To permit continuous operation of the internal combustion engine 1, during a working cycle of a cylinder 2, the combustion chamber 3 is first filled with the fuel-air mixture. The fuel-air mixture is compressed in the combustion chamber 3 and then ignited and burned in order to drive the reciprocating piston 6. Finally, the exhaust gas that remains after the combustion is discharged from the combustion chamber 3. Continuous repetition of this sequence results in continuous operation of the internal combustion engine 1, with work output in a manner proportional to the combustion energy.

Depending on the engine concept, a working cycle of the cylinder is divided into two strokes distributed over one crankshaft rotation (360°) (two-stroke engine) or into four strokes distributed over two crankshaft rotations (720°) (four-stroke engine). To date, the four-stroke engine has been the standard drive for motor vehicles.

In the intake stroke of a four-stroke engine, with a downward movement of the reciprocating piston 6, fuel-air mixture or else only fresh air (in the case of fuel direct injection) is introduced from the air intake tract 20 into the combustion chamber 3. During the following compression stroke, with an upward movement of the reciprocating piston 6, the fuel-air mixture or the fresh air is compressed in the combustion chamber 3, and if appropriate fuel is separately injected by means of an injection valve 5, which belongs to a fuel supply system, directly into the combustion chamber 3. During the following working stroke, the fuel-air mixture is ignited by means of an ignition plug 4, burns with an expanding action and expands, outputting work, with a downward movement of the reciprocating piston 6. Finally, in an exhaust stroke, with another upward movement of the reciprocating piston 6, the remaining exhaust gas is discharged out of the combustion chamber 3 into the exhaust-gas outlet tract 30.

The delimitation of the combustion chamber 3 with respect to the air intake tract 20 or exhaust-gas outlet tract 30 of the internal combustion engine is realized generally, and in particular in the example taken as a basis here, by means of inlet valves 22 and outlet valves 32. In the current state of the art, said valves are actuated by means of at least one camshaft. The example shown has an inlet camshaft 23 for actuating the inlet valves 22 and has an outlet camshaft 33 for actuating the outlet valves 32. There are normally yet further mechanical components for force transmission provided between the valves and the respective camshaft, which components may also include a valve play compensation means (e.g. bucket tappet, rocker lever, finger-type rocker, tappet rod, hydraulic tappet, etc.).

The inlet camshaft 23 and the outlet camshaft 33 are driven by means of the internal combustion engine 1 itself. For this purpose, the inlet camshaft 23 and the outlet camshaft 33, in each case by means of suitable inlet camshaft control adapters 24 and outlet camshaft control adapters 34, such as for example toothed gears, sprockets, or belt pulleys, and with the aid of a control mechanism 40, which has for example a toothed gear mechanism, a control chain, or a toothed control belt, are coupled, in a predefined position with respect to one another and with respect to the crankshaft 9 by means of a corresponding crankshaft control adapter 10, which is correspondingly formed as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. By way of example, FIG. 1 illustrates the coupling between inlet camshaft 23 and the outlet camshaft 33 and the crankshaft 9 by means of belt pulleys and a toothed control belt.

The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder may be formed for example as a toothed gear with a multiplicity of teeth distributed equidistantly over the circumference, wherein the number of individual teeth determines the resolution of the crankshaft phase angle signal. In some embodiments, the present phase angles of the inlet camshaft 23 and of the outlet camshaft 33 may be detected continuously by means of corresponding position encoders 43 and associated camshaft position sensors 42.

Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft. The respective rotational positions and stroke positions of reciprocating piston 6, inlet valves 22 and outlet valves 32 can thus, taking into consideration the respective transmission ratios, be set in relation to the crankshaft phase angle of the crankshaft 9 predefined by the crankshaft position sensor 41.

In an ideal internal combustion engine, it is thus possible for every particular crankshaft phase angle to be assigned a particular crankpin angle HZW (FIG. 2), a particular piston stroke, a particular inlet camshaft angle and thus a particular inlet valve stroke and also a particular outlet camshaft angle and thus a particular outlet valve stroke. That is to say, all of the stated components are, or move, in phase with the rotating crankshaft 9.

In modern internal combustion engines 1, there may be additional positioning elements within the mechanical coupling path between crankshaft 9 and inlet camshaft 23 and the outlet camshaft 33, for example in a manner integrated into the inlet camshaft adapter 24 and the outlet camshaft adapter 34, which positioning elements effect a desired controllable phase shift between the crankshaft 9 and inlet camshaft 23 and the outlet camshaft 33. These are known as phase adjusters used in variable valve drives.

The engine 1 of FIG. 1 includes an electronic programmable engine control unit 50 (CPU), which is equipped with signal inputs, for receiving the various sensor signals that characterize the operation of the internal combustion engine, and with signal and power outputs, for the actuation of corresponding positioning units and actuators for controlling the engine functions. For optimum operation of the internal combustion engine (with regard to emissions, consumption, power, running smoothness etc.), the fresh-gas charge introduced into the combustion chamber during the intake stroke should be known with the best possible accuracy in order to enable the further parameters for the combustion, such as for example the fuel quantity which is to be supplied, and which is possibly directly injected, to be coordinated therewith. The charge exchange, that is to say the intake of fresh gas and the discharge of the exhaust gas, is in this case highly dependent on the control timing of the inlet valves 22 and outlet valves 32, that is to say on the profile with respect to time of the respective valve strokes in relation to the profile with respect to time of the piston stroke.

In other words, during operation, the charge exchange is dependent on the phase positions of the inlet and outlet valves in relation to the crankshaft phase angle and thus in relation to the phase position of the reciprocating piston. For the determination of the fresh-gas charge and for coordinating the control parameters of the internal combustion engine therewith, the prior art involves performing measurement on a reference internal combustion engine in all occurring operating states, for example in a manner dependent on the rotational speed, the load, possibly the valve control timing predefinable by means of phase adjusters, possibly the operating parameters of exhaust-gas turbochargers or superchargers etc., and storing said measurement values, or derivatives thereof, or models reflecting the characteristics, on the engine control unit of a corresponding series-production internal combustion engine. All structurally identical, series-production internal combustion engines of the same type series are then operated with this reference dataset that has been generated.

A deviation, resulting for example from manufacturing tolerances, of the actual relative positions between inlet and outlet valves and the crankshaft phase angle or the reciprocating-piston position of a series-production internal combustion engine in relation to the ideal reference positions of the reference internal combustion engine, that is to say a phase difference of the inlet valve stroke, of the outlet valve stroke and possibly of the piston stroke in relation to the phase angle predefined by the crankshaft position sensor, or the phase position of the crankshaft, has the effect that the fresh-gas charge actually drawn in deviates from the fresh-gas charge determined as a reference, and thus the control parameters based on the reference dataset are not optimum. During the operation of the internal combustion engine, these errors can have adverse effects with regard to emissions, consumption, power, running smoothness etc.

Figure 2:
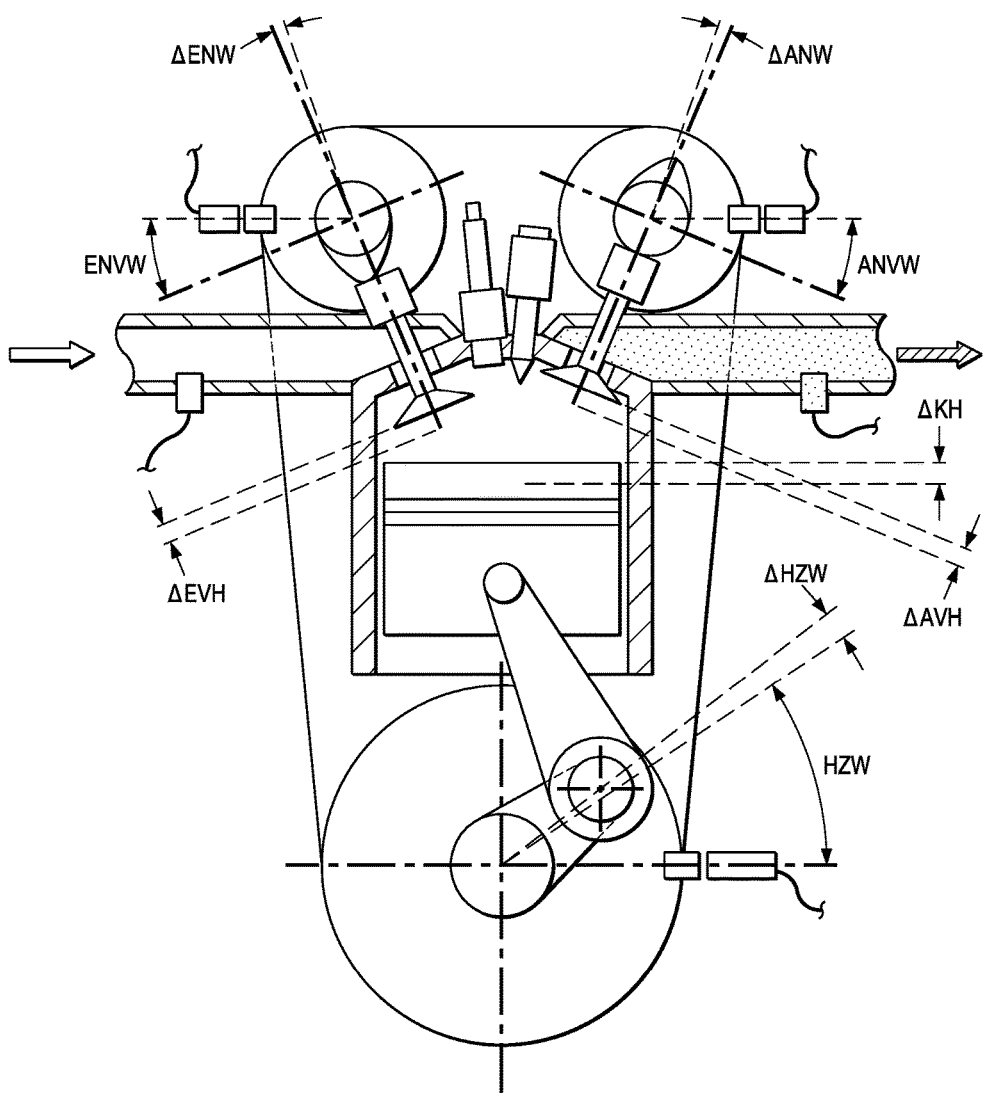
FIG. 2 shows the schematic diagram as per FIG. 1, with labelling of the possible position and angle deviations of significant components of the reciprocating-piston internal combustion engine.

For the illustration of the possible deviations that occur in a series-production internal combustion engine, and for the definition of the nomenclature of said deviations, reference will be made below to FIG. 2, which shows the internal combustion engine from FIG. 1 but in which, for a better overview, the reference designations illustrated in FIG. 1 have been omitted and only the corresponding deviations are designated. Proceeding from a reference position of the position encoder 43 arranged on the crankshaft control adapter 10, the phase angle of which position encoder is detected by the crankshaft position sensor 41, there are multiple tolerance chains that lead to deviations of the phase positions, hereinafter also referred to as phase differences, of reciprocating piston 6, inlet valves 22, and outlet valves 32 in relation to the ideal reference phase positions.

Here, the piston stroke phase difference ΔKH may result, for example, from a deviation of the crankpin angle HZW, the so-called crankpin angle difference ΔHZW, in relation to the reference position of the crankshaft position sensor 41 and from different dimensional tolerances (not illustrated) of connecting rod 7 and reciprocating piston 6. Furthermore, the inlet valve stroke phase difference ΔEVH may result, for example, from a deviation in the cam position, the so-called inlet camshaft angle difference ΔENW, together with mechanical tolerances (not illustrated) of the inlet camshaft control adapter 24 and of the control mechanism 40. If a phase adjuster for the inlet camshaft is present, then an inlet camshaft adjustment angle ENVW or to a deviation thereof from the setpoint may exist.

In the same way, the outlet valve stroke phase difference ΔAVH may result, for example, from a deviation in the cam position, the so-called outlet camshaft angle difference ΔANW, together with mechanical tolerances (not illustrated) of the outlet camshaft control adapter 24 and of the control mechanism 40. If a phase adjuster for the outlet camshaft is present, then there may be an outlet camshaft adjustment angle ANVW or a deviation thereof from the setpoint.

Possible causes of the described deviations may for example be:
- manufacturing and/or assembly tolerances of the mechanical components involved, and
- wear phenomena, such as for example a lengthening of the control chain or of the toothed belt by means of which the crankshaft and the camshafts are coupled, and
- deformation phenomena, elastic or plastic, resulting from high mechanical load states.

Typical previous solutions to the described problem rely on detecting and quantifying the occurring deviations between the reference internal combustion engine and series-production internal combustion engine to implement corresponding measures for correction or compensation through adaptation of control parameters. Furthermore, it has hitherto been sought to counteract this problem by minimizing manufacturing and assembly tolerances. For example, the control timing is measured on the respective static series-production internal combustion engine on the basis of valve stroke position, cam contour, etc., and the internal combustion engine is correspondingly adjusted during the assembly process.

Most presently known systems operate with a reference point system (position feedback). For example, one position mark that can be detected by means of a sensor is placed on the crankshaft and on the inlet camshaft and/or on the outlet camshaft, or also on the respective crankshaft control adapter and on the inlet camshaft control adapter and/or on the outlet camshaft control adapter, or also on a phase adjuster that may be provided, etc. In this way, the relative phase position between the crankshaft and the respective inlet camshaft and/or outlet camshaft can be determined, and deviations in relation to the desired reference values can be identified. The undesired effects of said deviations can then be counteracted in the control unit by means of an adaptation or correction of corresponding control parameters in a manner dependent on the determined deviations.

In principle, however, only some of the occurring tolerances can be identified by means of these methods. For example, it is not possible to identify an angular deviation owing to a position deviation of the respective position marks themselves in relation to the camshafts, or an inlet camshaft angle difference $\Delta$ENW, or an outlet camshaft angle difference $\Delta$ANW in relation to the respective reference position. Further methods, such as evaluating the knock sensor signal, evaluating the cylinder pressure signal, are likewise employed.

For example, U.S. Pat. No. 6,804,997 B1 describes an engine control device for determining the phase position of the crankshaft by monitoring and evaluating pressure fluctuations in the intake tract. The control device determines intake air pressure fluctuations, which indicate an intake air event, and thus a crankshaft phase position related thereto and the corresponding period thereof in the engine cycle. The control device utilizes these items of information to determine the crankshaft rotational speed and the phase position of the crankshaft to control the fuel injection and the ignition characteristics of the engine. The control timings of the inlet and outlet valves, e.g., inlet valve stroke phase differences and outlet valve stroke phase differences, are not taken into consideration in this case, and can under some circumstances considerably influence the result.

The document DE 10 2005 007 057 describes a closed-loop control method for a throttle flap air stream in the intake tract of an internal combustion engine, wherein pressure pulsations in the intake tract, which are influenced inter alia also by the valve control timings of the internal combustion engine, are taken into consideration in the closed-loop control of the fluid stream. For this purpose, the pressure pulsations are analyzed by means of fast Fourier transformation, and the amplitude information is summarized in a distortion factor which is taken into consideration as an additional input variable for example for a multi-dimensional mathematical closed-loop control model of the throttle flap air stream. Specific conclusions regarding the valve control timings, that is to say also possibly present inlet valve stroke phase differences and outlet valve stroke phase differences, of the internal combustion engine cannot be drawn by means of this method.

The document DE 35 06 114 A1 describes a method for the open-loop or closed-loop control of an internal combustion engine in which, in a manner dependent on an operating variable which comprises at least a part of an oscillation spectrum of the internal combustion engine as information, such as for example gas pressure signals, at least one manipulated variable of the internal combustion engine is controlled. For this purpose, from the detected operating variable, the value spectrum contained therein is determined, as a part of the oscillation spectrum, by discrete Fourier transformation and is used as a measurement spectrum and compared with a reference spectrum. That manipulated variable of the internal combustion engine which is to be controlled is then controlled in a manner dependent on the deviation between measurement spectrum and reference spectrum. Specific conclusions regarding the valve control timing and piston stroke position of the internal combustion engine cannot be easily drawn by means of this method either.

Document US 2009 0 312 932 A1 describes a method for performing diagnosis on the combustion within an internal combustion engine, wherein a combustion phase setting value is generated from the crankshaft angular speed by means of a fast Fourier transformation, said value is compared with an expected combustion phase setting value, and differences between said values greater than an admissible combustion phase setting difference are identified. A similar approach for determining deviations between a reference engine and series-production engine to those described above is also disclosed in US 2010 0 063 775 A1.

The teachings of the present disclosure may provide a simple and inexpensive method to provide a particularly accurate identification of the actual phase positions of the inlet valves, of the outlet valves, and of the reciprocating piston, and/or the piston stroke phase difference $\Delta$KH, the inlet valve stroke phase difference $\Delta$EVH, and the outlet valve stroke phase difference $\Delta$AVH can be reliably determined during ongoing operation of the internal combustion engine. Some embodiments may include a method for the combined identification of a piston stroke phase difference, of an inlet valve stroke phase difference, and of an outlet valve stroke phase difference of a cylinder of a series-production internal combustion engine during operation.

For example, dynamic pressure oscillations, assignable to the respective cylinder, of the intake air in the air intake tract and/or of the exhaust gas in the exhaust-gas outlet tract of the respective series-production internal combustion engine are measured during operation and a corresponding pressure oscillation signal is generated in each case from these. At the same time, a crankshaft phase angle signal is determined. From the pressure oscillation signal, using discrete Fourier transformation, the phase positions of selected signal frequencies of the measured pressure oscillations in relation to the crankshaft phase angle signal are determined.

Some embodiments may include one or more of the following:
- On the basis of the determined phase positions of the respective selected signal frequencies, lines of equal phase positions of the selected signal frequencies, which lines are dependent on inlet valve stroke phase difference and outlet valve stroke phase difference, are determined. This is performed using reference lines of equal phase positions, which reference lines are stored in reference line characteristic maps or determined by means of a respective model function;
- A common intersection point of the determined lines of equal phase positions of the selected signal frequencies is determined by projection into a common plane spanned by inlet valve stroke phase difference and outlet valve stroke phase difference and signal-frequency-dependent phase shifting of the determined lines of equal phase positions;
- The inlet valve stroke phase difference and the outlet valve stroke phase difference are determined from the determined common intersection point of the lines of equal phase positions of the selected signal frequencies, and
- The piston stroke phase difference is determined from the value of the phase shifts that have been performed to the common intersection point of the lines of equal phase positions of the selected signal frequencies.

A person skilled in the art will summarize all components that serve for the supply of air to the respective combustion chambers of the cylinders, and which thus define the so-called air path, under the expression "air intake tract" or also simply "intake tract", "intake system" or "inlet tract" of an internal combustion engine. These may include for example an air filter, an intake pipe, intake manifold or distributor pipe or, for short, suction pipe, a throttle flap valve, and possibly a compressor and the intake opening in the cylinder or the inlet duct of the cylinder.

By contrast, the expression "exhaust-gas outlet tract" or, for short, "exhaust-gas tract" or "outlet tract" of the internal combustion engine characterizes those components which serve for the controlled discharge of the exhaust gas that emerges from the combustion chambers after the combustion.

For the analysis of the pressure oscillation signal, the latter is subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position.

In some embodiments, the phase position of selected signal frequencies of the pressure oscillation signal are dependent on the valve control timings and the piston stroke of the internal combustion engine. The phase position of a signal frequency in this case characterizes the relative position of the signal frequency signal in relation to the crankshaft rotational angle signal.

In some embodiments, without additional sensors, the phase positions, that is to say the present stroke positions of the inlet valves, of the outlet valves and of the reciprocating piston of the internal combustion engine, can be determined in relation to the crankshaft phase angle and with high accuracy and can thus be used for the accurate calculation of the charge exchange process and for the tuning of the control parameters of the internal combustion engine.

Some embodiments may include performing measurement on a reference internal combustion engine in order to determine reference lines of equal phase positions of selected signal frequencies of the pressure oscillation signal of the intake air in the air intake tract and/or of the exhaust gas in the exhaust-gas outlet tract in a manner dependent on reference inlet valve stroke phase difference and reference outlet valve stroke phase difference, and storing the reference lines of equal phase positions of the selected signal frequencies of the pressure oscillation signal in a manner dependent on reference inlet valve stroke phase difference and reference outlet valve stroke phase difference in reference line characteristic maps. In this way, the determination of the inlet valve stroke phase difference and the outlet valve stroke phase difference and the piston stroke phase difference can be performed in a simple manner.

In some embodiments, the abovementioned reference line characteristic maps may be stored in a memory area of an existing engine control unit of the respective series-production internal combustion engine, and thus immediately available for use in the abovementioned method during the operation of the series-production internal combustion engine, without the need for separate memory means.

In some embodiments, from the reference line characteristic maps, determined as described above, of the selected signal frequencies of the pressure oscillation signal, for the respective signal frequency, an algebraic model function is derived which replicates the profile of the respective reference lines of equal phase angles of the selected signal frequencies of the pressure oscillation signal in a manner dependent on reference inlet valve stroke phase difference and reference outlet valve stroke phase difference. In this way, a mathematical formulation of the reference lines of equal phase angles is made available, which can be used during the further method for the analytical determination of the common intersection point of the lines of equal phase position and thus for the identification of the piston stroke phase difference, of the inlet valve stroke phase difference and of the outlet valve stroke phase difference.

In some embodiments, the algebraic model functions, determined as described above, for the selected signal frequencies may be stored in a memory area of an engine control unit of the respective series-production internal combustion engine. In this way, the algebraic model functions are immediately available in the controller and can be easily used for the respectively current determination of the lines of equal phase position. It is thus not necessary to store corresponding reference line characteristic maps in the memory, which comprise large quantities of data and thus give rise to an increased memory space requirement.

In some embodiments, the projection of the determined lines of equal phase positions into a common plane spanned by inlet valve stroke phase difference and outlet valve stroke phase difference, and the signal-frequency-dependent phase shifting of the determined lines of equal phase positions in order to determine a common intersection point, are performed on the basis of corresponding algebraic functions. For this purpose, the diagrammatic illustrations used in this patent application for an improved illustration of the method are converted into algebraic functions or processing operations. This is particularly advantageous in the case of the method being executed by means of an electronic, programmable processing unit, such as for example a corresponding engine control unit, on which the corresponding processing operations can be executed. In some embodiments, the method can be executed on an electronic, programmable engine control unit of the respective series-production internal combustion engine. No separate control or processing unit is necessary, and the algorithms of the method can be incorporated into the corresponding sequences of the engine control programs.

In some embodiments, an adaptation of control variables or control routines, for example the fuel mass for injection, the start time of the injection, the ignition time, the actuation of the phase adjusters of the camshafts, etc., in the context of a correction of or adaptation to the determined piston stroke phase difference, the determined inlet valve stroke phase difference and the determined outlet valve stroke phase difference is performed in the engine controller. It is thus possible for the combustion process to be optimized for the real conditions of the respective series-production internal combustion engine, and thus for the fuel demand and the emissions values to be reduced.

In some embodiments, the selected signal frequencies may correspond to the intake frequency as fundamental frequency or 1st harmonic and the further multiples, that is to say the 2nd to nth of the so-called "harmonics" of the intake frequency of the internal combustion engine. Here, the intake frequency in turn uniquely relates to the rotational speed of the internal combustion engine. Then, for said selected signal frequencies, taking into consideration the crankshaft phase angle signal detected in parallel, the phase position, referred to in this context as phase angle, of the selected signal frequencies is determined in relation to the crankshaft phase angle. This yields particularly unique results, which are thus easy to evaluate, in the determination of the lines of equal phase position, which thus results in high accuracy of the results.

In some embodiments, the dynamic pressure oscillations of the intake air in the air intake tract are measured by means of a series-production-type pressure sensor, which is already provided in any case, in the intake pipe. No additional sensor has to be provided for this purpose, and therefore no additional costs are incurred for executing the method. In some embodiments, the crankshaft phase angle signal can be determined by means of a toothed gear connected to the crankshaft and by means of a Hall sensor. Such a sensor arrangement is likewise already provided in modern internal combustion engines for other purposes. The crankshaft phase angle signal generated by means of said sensor arrangement can be easily jointly utilized.

Figure 3:
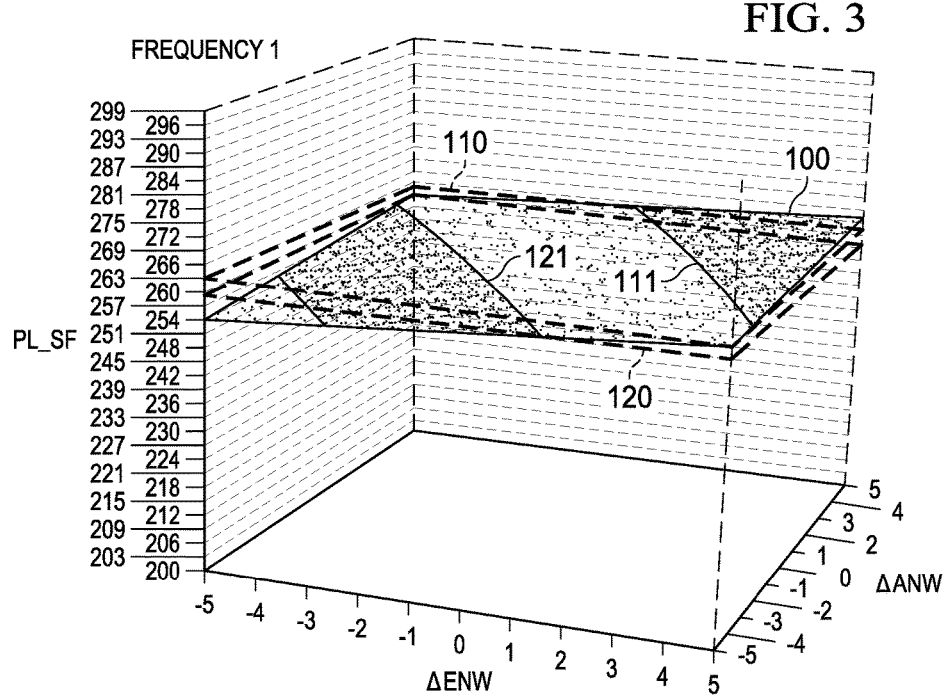
FIG. 3 shows two three-dimensional diagrams for illustrating the dependency of the phase position (PL_SF) of two selected signal frequencies of the pressure oscillation signal measured in the air intake tract and/or exhaust-gas tract on the inlet camshaft angle difference and the outlet camshaft angle difference.
Figure 3:
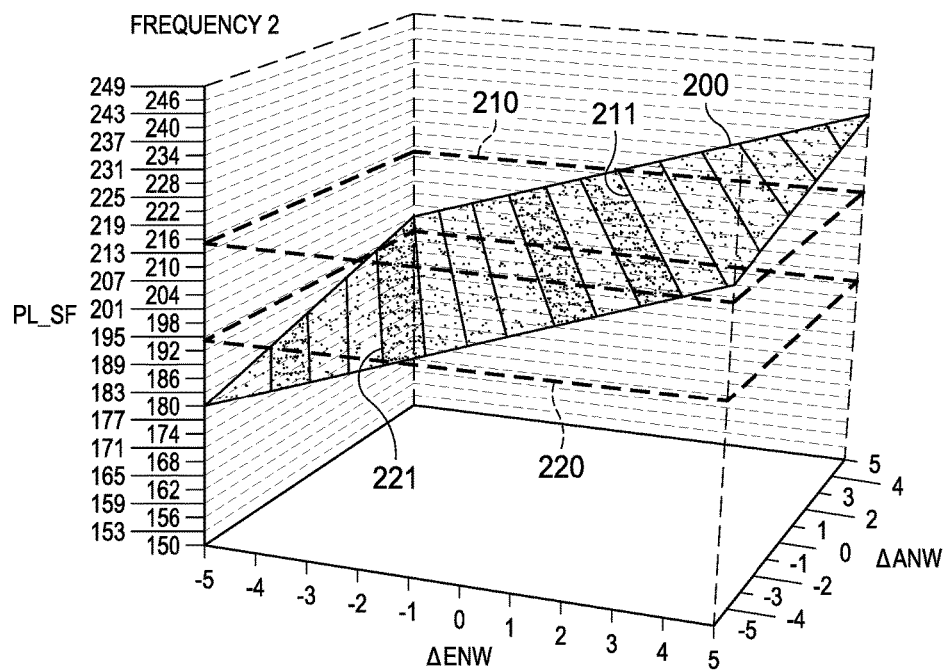

When varying the inlet valve stroke phase difference $\Delta EVH$ and the outlet valve stroke phase difference $\Delta AVH$ on an "ideal" reference internal combustion engine, and analyzing the pressure oscillation signal of the intake air in the air intake tract or of the exhaust gas in the exhaust-gas outlet tract, hereinafter referred to for short as pressure oscillation signal, by means of discrete Fourier analysis, and taking into consideration individual selected signal frequencies which corresponded in each case to the intake frequency or to a multiple of the intake frequency, it has been found that, in particular, the phase positions of the individual selected signal frequencies, that is to say the relative position of the pressure oscillation signal in relation to the crankshaft phase angle signal, are dependent on the inlet valve stroke phase difference $\Delta EVH$ and on the outlet valve stroke phase difference $\Delta AVH$. FIG. 3 illustrates this dependency for two different signal frequencies, the intake frequency, frequency 1, and the first harmonic, frequency 2.

For the variation of the inlet valve stroke phase difference $\Delta EVH$ and of the outlet valve stroke phase difference $\Delta AVH$, a respective phase adjuster was used for this purpose to vary the inlet camshaft angle difference $\Delta ENW$ and the outlet camshaft angle difference $\Delta ANW$ in the range between −5° and +5°, and the respectively associated phase position of the respective signal frequency PL_SF of the pressure oscillation signal was plotted vertically above the $\Delta ENW$-$\Delta ANW$ plane thus spanned. For every selected signal frequency, there is thus a resulting, differently inclined "phase surface" 100, 200 in the spanned three-dimensional space. If section planes 110, 120, 210, 220 lying parallel to the $\Delta ENW$-$\Delta ANW$ plane are now laid at the level of different phase positions PL_SF of the respective signal frequency, one obtains respective lines of intersection with the respective phase surface 100, 200, which lines can be referred to as lines of equal phase position. That is to say, for all $\Delta ENW$-$\Delta ANW$ combinations lying along such a line of equal phase position, one obtains the same phase position of the selected frequency of the pressure oscillation signal. Conversely, this means that a determined phase position of a signal frequency of the pressure oscillation signal cannot be assigned a unique $\Delta ENW$-$\Delta ANW$ combination.

FIG. 3 shows, in the case of frequency 1, the phase surface 100 and, by way of example, two section planes 110, 120 at phase positions 260° and 265°. The line of equal phase position 111 is obtained for phase position 263°, and the line of equal phase position 121 is obtained for phase position 260°. In the case of frequency 2, the phase surface 200 and, by way of example, two section planes 210, 220 at phase positions 216° and 195° are shown. The line of equal phase position 211 is obtained for phase position 216°, and the line of equal phase position 221 is obtained for phase position 195°.

Figure 4:
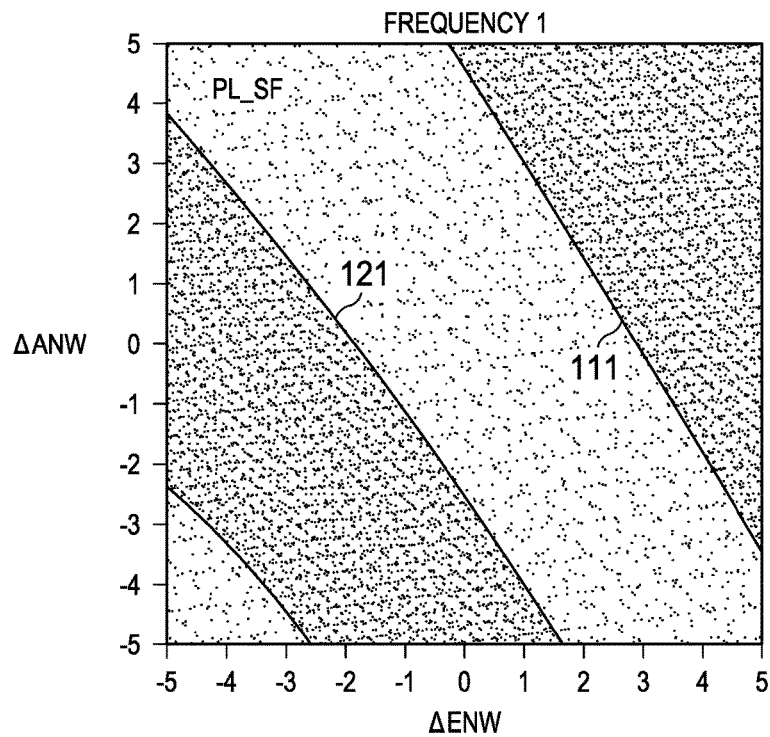
FIG. 4 shows two two-dimensional diagrams for illustrating lines of equal phase positions for two selected signal frequencies of the pressure oscillation signal measured in the air intake tract and/or exhaust-gas tract, projected into a plane spanned by the inlet camshaft angle difference and the outlet camshaft angle difference.
Figure 4:
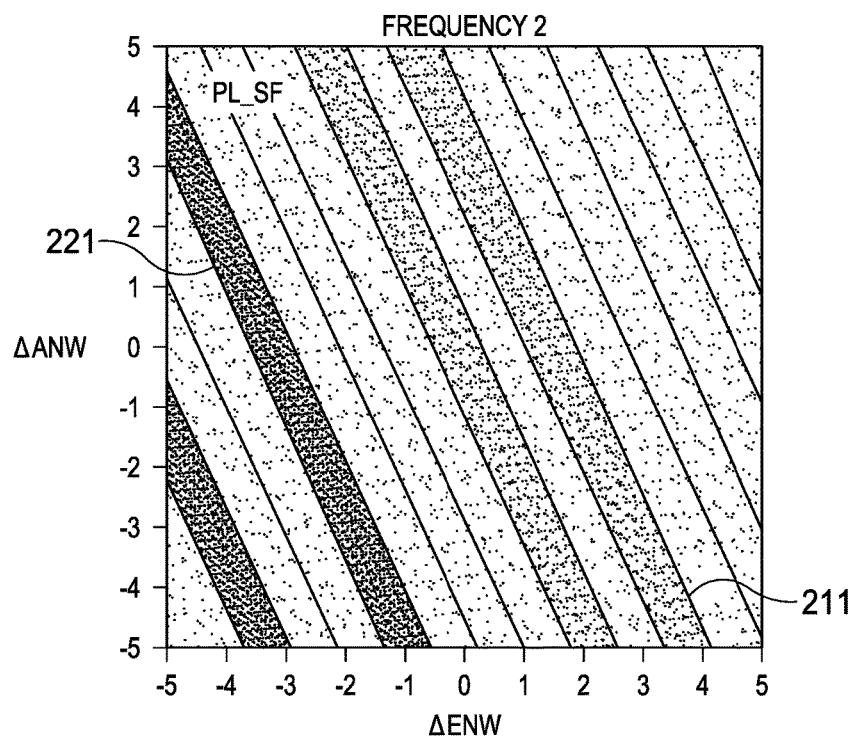
Figure 5:
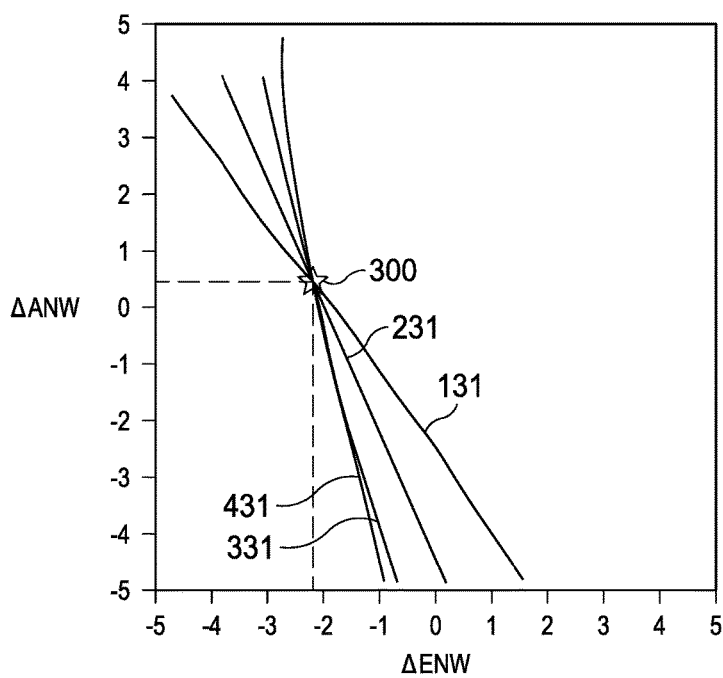
FIG. 5 shows a two-dimensional diagram as per FIG. 4 with plotted lines of equal phase positions of different signal frequencies for a particular combination of inlet camshaft angle difference and of the outlet camshaft angle difference.
Figure 6:
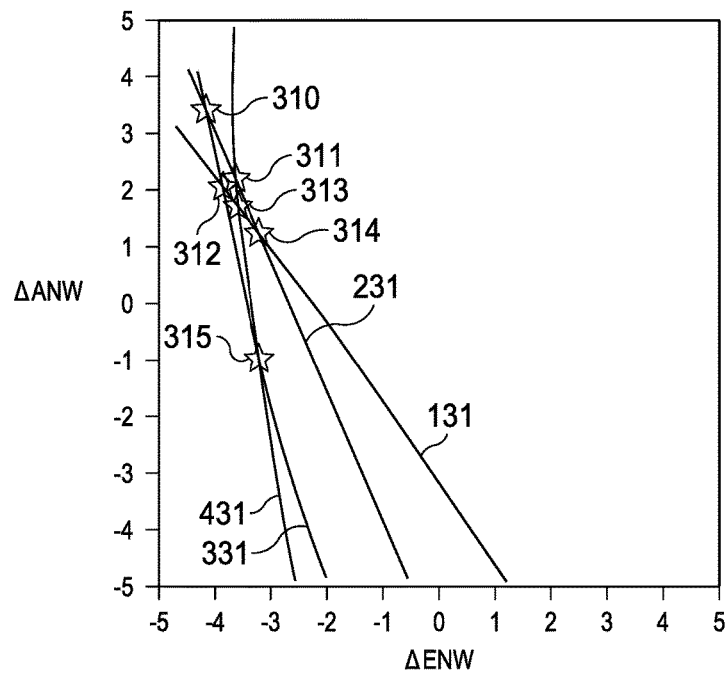
FIG. 6 shows a two-dimensional diagram as in FIG. 5 with plotted lines of equal phase positions of different signal frequencies for a particular combination of inlet camshaft angle difference and of the outlet camshaft angle difference in the case of a superposed piston stroke phase difference.

For the further examination of the relationships, the lines of equal phase position of each selected signal frequency of the pressure oscillation signal have now been projected into the $\Delta ENW$-$\Delta ANW$ plane. This is illustrated separately for frequency 1 and frequency 2 in FIG. 4, analogously to FIG. 3. The corresponding lines of equal phase position 111, 121 for frequency 1 at 263° and 260° and also 211, 221 for frequency 2 at 216° and 195° have been denoted by corresponding reference designations in this illustration too. The lines of equal phase positions of the different selected signal frequencies have different gradients. If one projects the lines of equal phase position of the different selected signal frequencies into the $\Delta ENW$-$\Delta ANW$ plane one above the other, as illustrated in FIG. 5 on the basis of lines of equal phase position 131, 231, 331 and 431, the lines of equal phase position of the different signal frequencies intersect at exactly one point, which thus represents a single $\Delta ENW$-$\Delta ANW$ combination. (it is pointed out that the lines of equal phase position illustrated in FIGS. 5 and 6 are not to be regarded as a continuation of the illustration from the preceding figures) Since, taking an ideal reference engine as a basis, a direct and uninfluenced interaction of the inlet camshaft 23 with the inlet valves 22 and of the outlet camshaft 33 with the outlet valves 32 can be assumed, an inlet camshaft angle difference $\Delta ENW$ can be assigned a specific inlet valve stroke phase difference $\Delta EVH$, and the outlet camshaft angle difference $\Delta ANW$ can be assigned a specific outlet valve stroke phase difference $\Delta AVH$. Thus, if one assumes otherwise ideal relationships, it is possible, by determining the phase position of the selected signal frequencies of the pressure oscillation signal, and taking into consideration and superposing the known lines of equal phase position of the determined phase positions of the respective signal frequency by projection into a common $\Delta EVH$-$\Delta AVH$ plane, to determine the single intersection point of the lines of equal phase position, and from this to determine the value of the inlet valve stroke phase difference ΔEVH and of the outlet valve stroke phase difference ΔAVH.

During further tests, a deviation of the reciprocating-piston position, a so-called piston stroke phase difference ΔKH, such as would also be expected in a series-production internal combustion engine, has now been superposed in addition to the inlet valve stroke phase difference ΔEVH and outlet valve stroke phase difference ΔAVH. Here, it has been found that, in the case of an additionally occurring piston stroke phase difference ΔKH, the lines of equal phase position of the selected signal frequencies, when superposed by projection into a common plane, no longer intersect at a single point. This is illustrated in FIG. 6. Here, when the lines of equal phase position are superposed, multiple separate intersection points 311 to 315 are formed.

It has however been found that the occurring piston stroke phase difference ΔKH gives rise to a phase shift, which is dependent on the respective selected signal frequency, of the respective line of equal phase position 131, 231, 331 and 431 of the different signal frequencies, the value of which phase shift is dependent on the value of the piston stroke phase difference ΔKH. Here, it has been found that, with increasing frequency, the value of the phase shift of the respective line of equal phase position also increases with a linear dependency. Thus, if, at a signal frequency corresponding to the 1st harmonic, a phase shift of the associated line of equal phase position by a value X occurs, then in the case of the 2nd harmonic, a phase shift of the associated line of equal phase position by 2X would be expected. Thus, by means of corresponding phase shifting of the individual determined lines of equal phase position 131, 231, 331 and 431 by a respectively determined value X, 2X, etc., which value is dependent on the piston stroke phase difference ΔKH, a single intersection point can be found again.

Here, as already described above, the position of the intersection point in the ΔENW-ΔANW plane provides information regarding the inlet camshaft angle difference ΔENW and the inlet valve stroke phase difference ΔEVH and also the outlet camshaft angle difference ΔANW and the outlet valve stroke phase difference ΔAVH. By contrast, the piston stroke phase difference ΔKH can be determined from the value of the required phase shift to the common intersection point of the lines of equal phase position 131, 231, 331 and 431.

The relationships graphically illustrated in FIGS. 3 to 6 serve for ease of understanding of the principles of the methods described herein. Said relationships may self-evidently also be represented on the basis of corresponding algebraic formulations, and the method may be executed on this basis by means of corresponding processing operations and program algorithms. For this purpose, mathematical-physical model functions corresponding for example to the illustration of the lines of equal phase positions are derived, which model functions can be used for the determination of the common intersection point and of the required phase shift.

Various methods for the combined identification of a piston stroke phase difference ΔKH, of an inlet valve stroke phase difference ΔEVH and of an outlet valve stroke phase difference ΔAVH of an internal combustion engine during operation are based on the realizations presented above. For example, during the operation of the internal combustion engine, the dynamic pressure oscillations of the intake air in the air intake tract or of the exhaust gas in the exhaust-gas outlet tract, or else in both regions, are measured continuously. The respective measurement results in a pressure oscillation signal. Said pressure oscillation signal is supplied to a control unit of the internal combustion engine. In the control unit, the pressure oscillation signal is subjected, by means of program algorithms stored therein, to a discrete Fourier transformation, and the phase position of selected signal frequencies, preferably of the first and further harmonics of the intake frequency of the internal combustion engine, of the measured pressure oscillations in relation to the crankshaft phase angle signal is determined. Subsequently, for the individual selected signal frequencies, on the basis of the respective phase position, in each case one corresponding line of equal phase position is determined. This is performed in each case either by selection of a reference line of equal phase position from a reference line characteristic map which is typical for the corresponding internal combustion engine series and which is stored in a memory area of the control unit, or by calculation by means of a respective algebraic model function, which is typical for the corresponding internal combustion engine series and which is stored in a memory area of the control unit, and corresponding processing operations and program algorithms.

The determined lines of equal phase position of the individual selected signal frequencies are then, by means of corresponding program algorithms stored in the control unit, projected into a common plane spanned by inlet valve stroke phase difference ΔEVH and outlet valve stroke phase difference ΔAVH, and if necessary brought to a single common intersection point by signal-frequency-dependent phase shifting of the individual lines. From the position of said common intersection point in the plane spanned by inlet valve stroke phase difference ΔEVH and outlet valve stroke phase difference ΔAVH, it is then possible to determine the inlet valve stroke phase difference ΔEVH and outlet valve stroke phase difference ΔAVH.

If the projection of the lines of equal phase position into said common plane does not already yield a single common intersection point, then it must be assumed that an additional piston stroke phase difference is present, which, as discussed above, has resulted in a shift of the phase position of the individual selected signal frequencies and thus of the corresponding lines of equal phase position in the same direction by a value dependent in each case on the associated signal frequency, that is to say in a signal-frequency-dependent manner. Since the shift of the phase position relates uniquely to the piston stroke phase difference, the corresponding signal-frequency-dependent (backward) shift of the lines of equal phase position to the single common intersection point results in a specific value for the piston stroke phase difference ΔKH. Thus, the piston stroke phase difference can be determined from the value of the phase shift that has been performed to the common intersection point of the lines of equal phase positions of the selected signal frequencies.

For the execution of the method, specific characteristic maps with reference lines of equal phase position or corresponding algebraic model functions should be available. These are dependent on the type of construction and the detailed structural design of the type series/series of an internal combustion engine and must therefore be determined on a structurally matching reference internal combustion engine that is typical of the series. For this purpose, on the reference internal combustion engine, the pressure oscillation signal in the air intake tract and/or in the exhaust-gas outlet tract is recorded at the greatest possible number of operating points, with variation of the inlet valve stroke phase difference ΔEVH and of the outlet valve stroke phase difference ΔAVH, and is subjected to a discrete Fourier transformation, and the phase positions for the selected signal frequencies are stored in a manner dependent on the inlet valve stroke phase difference ΔEVH and on the outlet valve stroke phase difference ΔAVH. It must be ensured here that no piston stroke phase difference ΔKH is superposed on and falsifies the results.

On the basis of these three-dimensional data maps determined, it is then possible, for the individual selected signal frequencies, for the lines of equal phase position to be determined and stored in corresponding characteristic maps, or for the algebraic model functions for the calculation of the lines of equal phase position to be determined. The characteristic maps and/or model functions determined are then stored in a memory area of a control unit of every structurally identical series-production internal combustion engine, and can be used for executing the method according to the invention.

Figure 7:
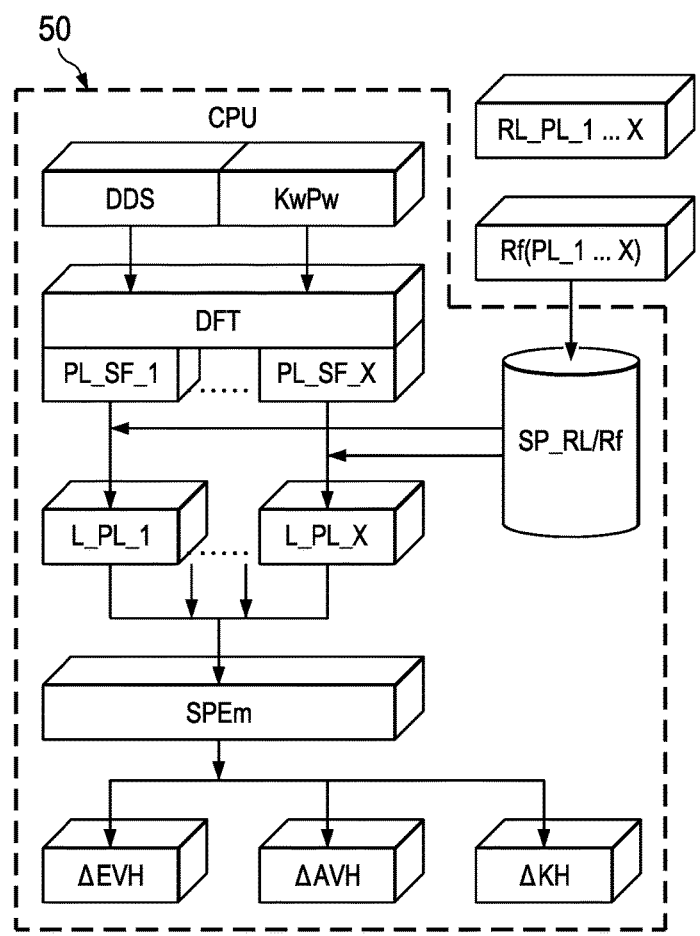
FIG. 7 shows a simplified block diagram for illustrating example methods according to the teachings of the present disclosure.

FIG. 7 illustrates an embodiment of the method according to the teachings herein for the combined identification of a piston stroke phase difference, of an inlet valve stroke phase difference and of an outlet valve stroke phase difference of a cylinder of a series-production internal combustion engine during operation, once again in the form of a simplified block diagram showing the major steps. At the start, dynamic pressure oscillations, assignable to the respective cylinder, of the intake air in the air intake tract and/or of the exhaust gas in the exhaust-gas outlet tract of the respective series-production internal combustion engine are measured during operation and a corresponding pressure oscillation signal is generated from these, and a crankshaft phase angle signal is determined at the same time, as illustrated by the blocks which are arranged in parallel and which are labelled DDS (dynamic pressure oscillation signal) and KwPw (crankshaft phase angle).

Then, from the pressure oscillation signal (DDS), using discrete Fourier transformation (DFT), the phase positions of multiple selected signal frequencies (PL_SF_1 . . . PL_SF_X) of the measured pressure oscillations in relation to the crankshaft phase angle signal (KwPw) are determined, which is illustrated by means of the blocks labelled DFT (discrete Fourier transformation) and PL_SF_1 . . . PL_SF_X (phase position of the respective signal frequency).

Then, on the basis of the determined phase position (PL_SF_1 . . . PL_SF_X) of the respective selected signal frequency, in each case one line of equal phase position (L_PL_1 . . . L_PL_X) of the respectively same signal frequency, which line is dependent on inlet valve stroke phase difference and outlet valve stroke phase difference, is determined, as illustrated by means of the correspondingly labelled blocks. This is performed using reference lines of equal phase position (RL-PL_1 . . . PL_PL_X) of the respective signal frequency, which reference lines are stored in reference line characteristic maps or determined by means of a respective algebraic model function. For this purpose, in the diagram in FIG. 7, a memory labelled Sp_RL/Rf is illustrated, from which the reference lines of equal phase position RL_PL_1 . . . X, or else corresponding algebraic model functions Rf(PL_1 . . . X), provided therein can be accessed for the purposes of determining said lines.

Subsequently, at least one respective common intersection point of the determined lines of equal phase position (L_PL_1 . . . L_PL_X) is then determined by projection into a common plane spanned by inlet valve stroke phase difference and outlet valve stroke phase difference and by signal-frequency-dependent phase shifting of the determined lines of equal phase positions, as illustrated by the block labelled SPEm (intersection point determination).

Finally, from the determined intersection point of the lines of equal phase position (L_PL_1 . . . L_PL_X) of the selected signal frequencies, the inlet valve stroke phase difference (ΔEVH) and the outlet valve stroke phase difference (ΔAVH) are determined. The piston stroke phase difference (ΔKH) is determined from the values of the phase shift that has been performed to the common intersection point of the lines of equal phase positions of the selected signal frequencies. This is illustrated by the correspondingly labelled blocks in FIG. 7.

Furthermore, FIG. 7 shows the steps, which precede the above-described method, of performing measurement on a reference internal combustion engine in order to determine reference lines of equal phase positions (RL_PL_1 . . . X) of selected signal frequencies of the pressure oscillation signal in the air intake tract and/or of the exhaust gas in the exhaust-gas outlet tract in a manner dependent on reference inlet valve stroke phase difference and reference outlet valve stroke phase difference, and storing the reference lines of equal phase positions of the selected signal frequencies of the pressure oscillation signal in each case in a manner dependent on reference inlet valve stroke phase difference and reference outlet valve stroke phase difference in reference line characteristic maps, as is symbolically illustrated by the block labelled RL_PL_1 . . . X.

The block labelled Rf(PL_1 . . .x) comprises the derivation of algebraic model functions which, as reference line functions of equal phase position (Rf(PL_1) . . . Rf(PL_X)), replicate the profile of the respective reference lines of equal phase positions of the selected signal frequencies of the pressure oscillation signal in a manner dependent on the reference inlet valve stroke phase difference and reference outlet valve stroke phase difference, on the basis of the previously determined reference line characteristic maps.

The reference line characteristic maps or reference line functions of equal phase position are then stored in a memory area (Sp_RL/Rf) of an engine control unit (CPU) of the respective series-production internal combustion engine, where they are available for the execution of the method according to the invention as discussed above.

The border shown by dashed lines around the corresponding blocks in the block diagram symbolically represents the boundary between an electronic programmable engine control unit 50 (CPU) of the respective series-production internal combustion engine, on which the method is executed.

What is claimed is:
1. A method for operating an internal combustion engine, the method comprising:
identifying a piston stroke phase difference, an inlet valve stroke phase difference, and an outlet valve stroke phase difference of a cylinder of a series-production internal combustion engine during operation;
measuring dynamic pressure oscillations assigned to the cylinder of the intake air in the air intake tract and/or of the exhaust gas in the exhaust-gas outlet tract of the respective series-production internal combustion engine during operation;
generating a corresponding pressure oscillation signal from the measured values;
determining a crankshaft phase angle signal at the same time;
applying a discrete Fourier transformation from the pressure oscillation signal;

determining the phase positions of selected signal frequencies of the measured pressure oscillations in relation to the crankshaft phase angle signal;

determining lines of equal phase positions of the selected signal frequencies on the basis of the determined phase positions of the respective selected signal frequencies, said lines depending at least in part on an inlet valve stroke phase difference and an outlet valve stroke phase difference;

using reference lines of equal phase positions, said reference lines stored in reference line characteristic maps or determined by means of a respective algebraic model function;

determining a common intersection point of the determined lines of equal phase positions of the selected signal frequencies by projection into a common plane spanned by inlet valve stroke phase difference and outlet valve stroke phase difference and signal-frequency-dependent phase shifting of the determined lines of equal phase positions;

determining the inlet valve stroke phase difference and the outlet valve stroke phase difference from the determined common intersection point of the lines of equal phase positions of the selected signal frequencies;

determining the piston stroke phase difference from the values of the phase shift that has been performed to the common intersection point of the lines of equal phase positions of the selected signal frequencies; and adjusting an amount of a fuel injection based on the determined differences.

2. The method as claimed in claim 1, further comprising:

measuring a reference internal combustion engine to determine reference lines of equal phase positions of selected signal frequencies of the pressure oscillation signal of the intake air in the air intake tract and/or of the exhaust gas in the exhaust-gas outlet tract in a manner dependent on reference inlet valve stroke phase difference and reference outlet valve stroke phase difference; and storing the reference lines of equal phase positions of the selected signal frequencies of the pressure oscillation signal in a manner dependent on reference inlet valve stroke phase difference and reference outlet valve stroke phase difference in reference line characteristic maps.

3. The method as claimed in claim 2, further comprising storing the reference line characteristic maps in a memory area of an engine control unit of the respective series-production internal combustion engine.

4. The method as claimed in claim 2, further comprising:

deriving an algebraic model function from the reference line characteristic maps of the selected signal frequencies of the pressure oscillation signal, for the respective signal frequency, the algebraic model function replicating a profile of the respective reference lines of equal phase positions of the selected signal frequencies of the pressure oscillation signal depending on a reference inlet valve stroke phase difference and a reference outlet valve stroke phase difference.

5. The method as claimed in claim 4, further comprising storing the algebraic model functions for the selected signal frequencies in a memory area of an engine control unit of the respective series-production internal combustion engine.

6. The method as claimed in claim 1, further comprising performing the projection of the determined lines of equal phase positions into a common plane spanned by inlet valve stroke phase difference and outlet valve stroke phase difference, and the signal-frequency-dependent phase shifting of the determined lines of equal phase positions in order to determine their common intersection point on the basis of corresponding algebraic functions.

7. The method as claimed in claim 1, wherein the method is executed by an electronic, programmable engine control unit of the respective series-production internal combustion engine.

8. The method as claimed in claim 7, further comprising performing an adaptation of control variables or control routines in the context of a correction of or adaptation to the determined piston stroke phase difference, the determined inlet valve stroke phase difference, and the determined outlet valve stroke phase difference on the engine control unit.

9. The method as claimed in claim 1, wherein the selected signal frequencies include the intake frequency and further multiples of the intake frequency of the internal combustion engine.

10. The method as claimed in claim 1, further comprising measuring the dynamic pressure oscillations with a series-production-type pressure sensor in the intake pipe.

11. The method as claimed in claim 1, further comprising determining the crankshaft phase angle signal with a toothed gear connected to the crankshaft and a Hall sensor.

* * * * *